US006828020B2

(12) United States Patent
Fisher et al.

(10) Patent No.: US 6,828,020 B2
(45) Date of Patent: Dec. 7, 2004

(54) SELF-ADHESIVE VIBRATION DAMPING TAPE AND COMPOSITION

(75) Inventors: Dennis K. Fisher, Brooklyn, MI (US); Siddhartha Asthana, Ann Arbor, MI (US)

(73) Assignee: Adco Products, Inc., Michigan Center, MI (US)

( * ) Notice: Subject to any disclaimer, the term of this patent is extended or adjusted under 35 U.S.C. 154(b) by 83 days.

(21) Appl. No.: 10/218,992

(22) Filed: Aug. 14, 2002

(65) Prior Publication Data

US 2004/0033354 A1 Feb. 19, 2004

(51) Int. Cl.[7] .............................. B32B 27/32
(52) U.S. Cl. ................... 428/355 EN; 428/355 AC; 428/355 BL; 428/500; 428/521; 524/81; 524/500; 524/502; 524/515; 524/525; 524/526
(58) Field of Search ................ 428/355 EN, 355 AC, 428/355 BL, 500, 521; 524/81, 500, 502, 515, 525, 526

(56) References Cited

U.S. PATENT DOCUMENTS

| 4,438,228 A | 3/1984 | Schenck |
| 4,456,705 A | 6/1984 | McCarthy |
| 4,495,240 A | 1/1985 | McCarthy |
| 4,952,610 A | 8/1990 | Moore, III et al. |
| 5,573,587 A | 11/1996 | St. Louis |
| 5,635,562 A | 6/1997 | Malcolm |
| 5,712,038 A | 1/1998 | Yamazaki et al. |
| 5,765,293 A | 6/1998 | St. Louis et al. |
| 5,840,797 A | 11/1998 | Singh |
| 5,858,521 A | 1/1999 | Okuda et al. |
| 5,945,643 A | 8/1999 | Casser |
| 6,099,898 A | 8/2000 | Joyce et al. |
| 6,110,985 A | 8/2000 | Wheeler |
| 6,130,284 A | 10/2000 | Singh |
| 2003/0021989 A1 * | 1/2003 | Zhou et al. ............. 428/343 |

FOREIGN PATENT DOCUMENTS

| JP | 04141415 A | 5/1992 |
| JP | 090298995 A | 2/1997 |
| WO | WO 9212006 | 7/1992 |

* cited by examiner

*Primary Examiner*—Daniel S. Metzmaier
*Assistant Examiner*—Christopher Keehan
(74) *Attorney, Agent, or Firm*—Dinsmore & Shohl LLP

(57) ABSTRACT

A self-adhesive vibration damping tape for adhering to a substrate is provided. The tape is formed from a vibration damping composition comprising a synthetic rubber polymer, a thermoplastic polymer, a plasticizer, and an organic filler comprised of recycled automotive paint powder. The composition is preferably formed into a tape which includes a release liner on one surface and an aluminum foil facing on the other surface. In use, the tape is adhered on one surface to a substrate such as an automotive or appliance part to provide vibration damping properties as well as seal out the infiltration of air, dust and moisture.

18 Claims, 1 Drawing Sheet

SELF-ADHESIVE VIBRATION DAMPING TAPE AND COMPOSITION

BACKGROUND OF THE INVENTION

The present invention is directed to an adhesive tape formed from a vibration damping composition, and more particularly, to a vibration damping composition which can be extruded into the form of a self-adhesive vibration damping tape for use in automotive, appliance and other applications.

Vibration damping materials are widely used in industry to dampen the vibration and sounds of mechanical systems, such as automobiles, and appliances, such as washers and dryers, refrigerators, etc. Typically, vibration damping materials comprise thermoplastic or rubber materials which are capable of suppressing vibrations and sounds. The vibration damping materials are applied to selected parts or areas of the automobile or appliance to prevent vibrations and noise from being transmitted inside the automobile or outside the appliance.

A common method of applying the vibration damping material is to provide it in the form of a sheet or tape including an adhesive layer which adheres the damping material to the desired substrate, such as an automobile body panel or interior panel of an appliance. However, this requires that the vibration damping material be laminated to at least one pressure sensitive adhesive layer. Alternatively, the sheet or tape may be adhered to the substrate using mechanical fasteners. See, for example, U.S. Pat. Nos. 5,635,562, 5,712,038, and 5,858,521. However, the use of a separate adhesive layer or fastening materials adds additional steps and materials to the manufacturing process, which is both time-consuming and costly.

Accordingly, there is a need in the art for a vibration damping material tape which provides excellent vibration damping properties and which can be easily adhered to a substrate such as an automotive body panel or appliance wall without the need for separate adhesives or fasteners.

SUMMARY OF THE INVENTION

The present invention meets that need by providing a self-adhesive vibration damping tape which provides high bond adhesion to a substrate. In addition, the vibration damping tape of the present invention provides good vibration damping properties as well as sealing out the infiltration of air, dust and moisture.

According to one aspect of the present invention, a self-adhesive vibration damping tape is provided which comprises a vibration damping composition comprising a synthetic rubber polymer, a thermoplastic polymer selected from the group consisting of amorphous polyolefins and ethylene-based copolymers or terpolymers, a plasticizer, and an organic filler. The vibration damping composition is in the form of a tape having first and second major surfaces.

The synthetic rubber polymer is preferably selected from the group consisting of butyl rubber, polyisobutylene, and mixtures thereof.

In one embodiment of the invention, the thermoplastic polymer comprises an amorphous polyolefin selected from the group consisting of polypropylene-ethylene copolymers, polypropylene/polypropylene-ethylene copolymers, polypropylene homopolymers, polyethylene homopolymers, and mixtures thereof. In an alternative embodiment, the thermoplastic polymer comprises an ethylene-based copolymer or terpolymer selected from the group consisting of ethylene/vinyl acetate copolymers, ethylene/vinyl acetate/acid terpolymers, ethylene-acrylic acid copolymers, and mixtures thereof.

The plasticizer in the vibration damping composition preferably comprises polybutene.

The organic filler preferably comprises recycled automotive paint powder, which contributes to the vibration damping properties of the composition.

In a preferred embodiment of the invention, the self-adhesive vibration damping tape composition comprises from about 5 to 10% by weight of a synthetic rubber polymer; from about 1 to 10% by weight of a thermoplastic polymer selected from the group consisting of amorphous polyolefins and ethylene-based copolymers or terpolymers; from about 15 to 30% by weight of a plasticizer, and from about 5 to 50% by weight of an organic filler. More preferably, the composition comprises from about 23 to about 27% by weight of an organic filler.

The vibration damping composition may further include an antioxidant, an adhesion promoter, one or more coloring agents, dispersing agents, and conventional fillers such as inorganic fillers, reinforcing silicas, or desiccants.

In a preferred embodiment of the invention, a release liner is adhered to at least one major surface of the tape. An aluminum foil facing is also preferably laminated to at least one major surface of the tape. The facing preferably comprises aluminum foil, but may also comprise other metals, or plastics. Preferably, the release liner is adhered to one surface of the tape, and the aluminum foil facing is laminated to the other surface of the tape. The vibration damping tape (including the tape and facing) preferably has a thickness of about 0.5 to 2.0 mm.

In use, the self-adhesive vibration damping tape is adhered to a substrate such as an automotive or appliance part. The substrate may be comprised of a metal such as steel, or may also comprise wood, glass, or fabric. The tape is preferably adhered by removing the release liner such that the tape is adhered on its second surface to the substrate, such that the aluminum foil facing on its first surface faces outward. Once adhered, the tape/substrate composite exhibits a minimum composite loss factor of 0.05 at a temperature range of −0° C. to 60° C. and resonance frequency of 200 Hz. By "composite," it is meant the combination of the damping tape adhered to a substrate.

Accordingly, it is a feature of the present invention to provide a self-adhesive vibration damping composition which may be adhered to a substrate such as an automotive or appliance part. Other features and advantages of the invention will be apparent from the following description, the accompanying drawings, and the appended claims.

DETAILED DESCRIPTION OF THE PREFERRED EMBODIMENTS

Figure 1:
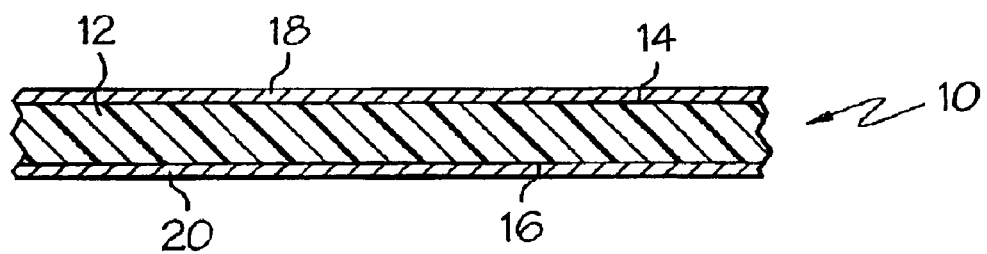
FIG. 1 is a perspective view of the self-adhesive vibration damping tape of the present invention.

The self-adhesive vibration damping tape of the present invention provides a number of advantages over prior vibration damping materials used in automotive or appliance applications. Use of the vibration damping tape of the present invention eliminates the need for a separate adhesive layer or separate fastening means because the tape of the present invention can function as both an adhesive and a damping material. In addition, we have found that the use of an organic filler comprising recycled automotive paint powder unexpectedly contributes to the vibration damping properties of the composition. While not wishing to be bound to a particular theory, it is believed that the high organic content (about 75 to 80% by weight) of the paint powder is effective in absorbing sound and vibration energy, particularly in the glass transition region of the polymeric materials contained in the powder. We have found that the acrylic polymers are prevalent in the filler and have a glass transition temperature (Tg) of about 120° C., while various other polymers in the filler have glass transition temperatures ranging from about 40° C. to about 100° C. Thus, sound and vibrational energy created by automobiles or appliances is converted into internal vibrational, rotational, and/or translational motions by the polymers in the filler above their glass transition temperature. It should be appreciated that the inclusion of one or more plasticizers in the vibration damping composition reduces the glass transition temperature of the polymers so that they also provide damping properties at lower temperatures. For example, the glass transition temperature of the final vibration damping composition may range from about −60° C. to about −20° C.

The organic filler comprises recycled automotive paint powder which is comprised of inert, cured, mixed polymeric thermoplastic resins. Suitable organic fillers include Dry Pure I or Dry Pure II, commercially available from Haden, Inc. Such fillers are formed by converting paint waste generated in an automotive paint spray process to a dry powder as described in U.S. Pat. Nos. 5,573,587, 5,765,293 and 6,099,898, the disclosures of which are incorporated herein by reference. The organic filler is included in an amount of about 5 to 50% by weight, preferably, about 15 to 35% by weight, and more preferably about 23 to 27% by weight of the composition.

The vibration damping composition preferably comprises, as the synthetic rubber polymer component, butyl rubber, polyisobutylene, or mixtures thereof. Suitable butyl rubbers include Butyl 065, 077, 165, 268 or 365, Exxpro 96-1, commercially available from ExxonMobil Chemical. The butyl rubber may also comprise halogenated butyl rubber such as Bromobutyl 2030 or X-2, or Chlorobutyl 1240 or 1255, commercially available from Bayer; or Bromobutyl 2222, 2244, or 2255, or Chlorobutyl HT-1065, HT-1066, or HT-1068, commercially available from ExxonMobil Chemical. The synthetic rubber polymer component preferably comprises from about 5 to 10% by weight of the composition.

The polyisobutylene component may comprise a high molecular weight polyisobutylene such as Vistanex L-80, L-100, L-120, or L-140, commercially available from ExxonMobil Chemical, or Oppanol B-50, B-80 or B-100, commercially available from BASF Corporation. The polyisobutylene may also comprise low molecular weight polyisobutylene such as Vistanex CP-24, LM-MS, LM-MH, LM-H or LM-S, commercially available from ExxonMobil Chemical, or Oppanol B-10, B-12, B-15 or B-30, commercially available from BASF Corporation, or P-10, P-12, or P-15, commercially available from Alcan Rubber and Chemical, or 4.0H, 4.5H, 5.0H, 5.5H, or 6HT, all commercially available from Rit-Chem.

The thermoplastic polymer component of the composition preferably comprises an amorphous polyolefin or an ethylene based copolymer or terpolymer. Suitable amorphous polyolefins include amorphous polypropylene-ethylene copolymers including E1003, E1060 or E1200; amorphous polypropylene/polypropylene-ethylene copolymers including M1010, M1018, M1020, M1025 or M1030; or amorphous polypropylene homopolymers including P1010 or P1023, all commercially available from Eastman Chemical; or Polytac R-500, commercially available from Crowley Chemical. Also suitable are amorphous polyethylene homopolymers including Epolene C-10, C-13, C-14, C-15, C-17, N-10, N-11, N-14, N-15, N-20, N-21 and N-34, all commercially available from Eastman Chemical; AC-6, AC-7, AC-8, AC-9, AC-617, AC-712, AC-715, AC-725, AC-735, or AC-1702, commercially available from Honeywell.

Suitable ethylene-based copolymers include ethylene/vinyl acetate copolymers including Elvax 40-W, 140-W, 150-W, 205-W, 210-W, 220-W, 240-W, 250-W, 260, 265, 310, 350, 360, 410, 420, 450, 460, 470, 550, 560, 650, 660, 670, 750, 760, or 770, all commercially available from DuPont; and AC-400, AC-400A, AC-405 or AC-430, all commercially available from Honeywell. Also suitable are ethylene-acrylic acid copolymers including AC-540, AC-540A, AC-580 and AC-5120, all commercially available from Honeywell. Suitable ethylene-based terpolymers include ethylene/vinyl acetate terpolymers including Elvax 4260, 4310, 4320 or 4355, commercially available from Honeywell.

The vibration damping composition also includes a compatible plasticizer. The plasticizer imparts softness and high initial adhesivity to the vibration damping composition. Suitable plasticizers include polybutene, such as Indopol H-100, H-300, H-1500 or H-1900, all commercially available from Amoco Chemical; and Parapol 700, 950, 1300, 2200 or 2500, all commercially available from ExxonMobil Chemical. Mixtures of these plasticizers may also be used. The plasticizer is preferably included in the composition in amounts of from about 15 to 30% by weight of the composition.

The vibration damping composition may also contain conventional inorganic fillers including, but not limited to, barium sulfate, calcium carbonate, diatomaceous earth, magnesium silicate, mica, hydrous aluminum silicate, and mixtures thereof. The inorganic filler(s) may comprise from 20 to 60% by weight of the composition, and more preferably, from about 35 to 60% by weight of the composition.

The composition may also include a tackifying resin, such as terpenes, hydrogenated polycyclic resins, rosin esters, or aliphatic and/or aromatic hydrocarbon resins. The tackifying resin is preferably present in an amount of from about 1 to 10% by weight to provide softness and high initial adhesivity to the composition. Suitable hydrogenated polylicyclic resins include P-95, P-115, P-125 or P-140, commercially available from Arakawa Chemical; Escorez 5380, 5300, 5320 or 5340, commercially available from ExxonMobil Chemical; Regalite R91, R101, R125 or S260 and Regalrez 1018, 1085, 1094, 1126, 1128, 1139, 3102, 5095 or 4108, commercially available from Hercules; Eastotac H-100W, H-115W or H-130W, commercially available from Eastman Chemical; Sukorez SU-100, SU-110, SU-120 or SU-130, commercially available from Kolon Chemical.

Suitable aliphatic hydrocarbon resins include Escorez 1102, 1304, 1310LC, 1315 or 1504, commercially available from ExxonMobil Chemical; Nevtac 10, 80, 100 or 115, commercially available from Neville Chemical; Wingtack 10, 95 or Plus, commercially available from Goodyear Tire & Rubber; Eastotac H-100E, H-100R, H-100L, H-115E, H-115R, H-115L, H-130E, H-130R or H-130L, commercially available from Eastman Chemical; Adtac LV, Piccopale 100, Piccotac B, Piccotac 95 or Piccotac 115, commercially available from Hercules; Hikorez A-1100, A-1100S, C-1100, R-1100, R-1100S or T1080, commercially available from Kolon Chemical; ADHM-100, commercially available from Polysat Suitable aromatic hydrocarbon resins include Nevchem 70, 100, 110, 120, 130, 140 or 150, commercially available from Neville Chemical; Escorez 7105 or 7312, commercially available from ExxonMobil Chemical; Hikotack P-90, P-90S, P-110S, P-120, P-120S, P-120HS, P-140, P-140M, P-150 or P-160, commercially available from Kolon Chemical; Picco 1104, 2100, 5120, 5130, 5140, 6085, 6100, 6115 or 9140, Piccodiene 2215 or Piccovar AP10, AP25 or L60, commercially available from Hercules.

Other suitable tackifying resins include coumarone indene resins, for example, Cumar P-10, P-25, R-1, R-3, R-5, R-6, R-7, R-9, R-10, R-11, R-12, R-13, R-14, R-15, R-16, R-17, R-19, R-21, R-27, R-28, R-29 or LX-509, commercially available from Neville Chemical; or Natrorez 10 or 25, commercially available from Natrochem. Another suitable tackifying resin is an ester of hydrogenated rosin, for example, Foral 85 or 105 or Pentalyn A or H or Hercolyn D or Stabelite Ester 10 or Albalyn, commercially available from Hercules; or Komotac KF-462S, commercially available from Komo Chemical. Mixtures of the above resins may also be used.

The vibration damping composition also preferably contains a dispersing agent comprising a fatty acid such as lauric acid, palmitic acid, stearic acid, oleic acid, linoleic acid, linolenic acid, elaeostearic acid, ricinoleic acid, and mixtures thereof. The dispersing agent may be included in an amount of from about 0.1 to 1% by weight of the composition.

The vibration damping composition also preferably includes a coloring agent. Suitable coloring agents include titanium dioxide, carbon black, and coal filler. The coloring agent is preferably included in an amount of from about 1 to 10% by weight.

The composition may also include a reinforcing agent such as silica. The reinforcing agent may be included in an amount of about 1 to 3% by weight of the composition. Preferred reinforcing agents include hydrophilic fumed silicas such as Aerosil 90, 130, 150, 200, 300 or 380, commercially available from Degussa; Cab-O-Sil H-5, HS-5, L-90, LM-130, LM-150, M-5, PTG, MS-55, or EH-5, commercially available from Cabot; hydrophobic fumed silicas, such as Aerosil R202, R805, R812, R812S, R972, R974 or US202, commercially available from Degussa; Cab-O-Sil TS-530, TS-610 or TS-720, commercially available from Cabot; hydrated amorphous precipitated silica, for example, Hi-Sil 132, 135, 210, 233, 243LD, 255, 532EP, 752, 900, 915 or 2000, commercially available from PPG Industries; Hubersil 162, 162LR, 1613, 1633, 1714, 1743, or 4151 H, commercially available from J. M. Huber; or Garamite 1958, commercially available from Southern Clay Products. Mixtures of the above products may also be used.

Desiccants such as calcium oxide (lime), or molecular sieves may also be included in the composition in an amount of about 1 to 10% by weight of the composition, and more preferably, about 0.5 to 1.0% by weight.

The composition also preferably includes an adhesion promoter. A preferred adhesion promoter is an organosilane such as Silane A-174, A-187, A-189, or A-1100, commercially available from Osi Specialties; Sartomer 9050 or Sartomer 350, commercially available from Sartomer; Z-6040 or Z-6011, commercially available from Dow Corning; or AMEO-P, GLYMO, MEMO or MTMO, commercially available from Sivento. The adhesion promoter may be included in the composition in an amount of between about 0.1 to 1% by weight.

The composition also preferably includes an antioxidant in an amount comprising 0.1 to 1% by weight of the composition. Suitable antioxidants include, but are not limited to Wingstay C, K, L, S or T, commercially available from Goodyear, and Irganox 245, 259, 565, 1010, 1035, 1076, 1098, 1330, 1425, 1520 or 3144, commercially available from Ciba Specialty Chemicals.

The vibration damping tape is preferably formed by combining all of the components of the composition into a conventional double-arm sigma blade mixer for about three hours to obtain good dispersion of all components. The resulting mastic composition may then be extruded in the form of a tape. The extruded tape is then preferably wound in a roll on a release liner and then laminated with aluminum foil. Alternatively, the tape may be provided in the form of strips which are slit or die cut to a desired length. The tape may range in thickness from about 0.5 mm to 2.0 mm and may be provided in widths ranging from about 5 mm to 500 mm.

Referring now to FIG. 1, the self-adhesive vibration damping tape 10 of the present invention is illustrated. The tape is formed from a vibration damping composition 12 which has been formed, preferably by extrusion, so that it has first and second surfaces 14 and 16. An aluminum foil facing 18 is preferably laminated to the first surface of the composition and a release liner 20 is adhered to the second surface of the composition.

The release liner is preferably comprised of kraft paper (30 to 90 pound basis weight) or a polyethylene film of about 3–7 mils thickness. The release liner may include a silicone or non-silicone release coating, or other conventional release coating.

Figure 2:
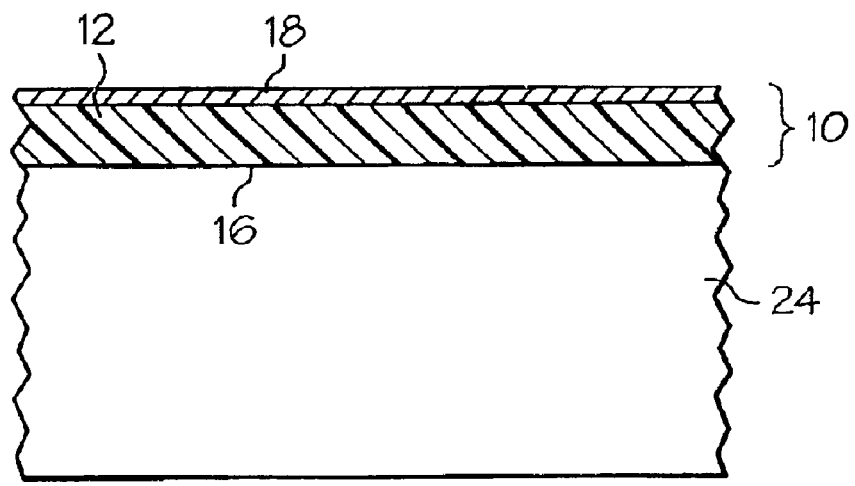
FIG. 2 is a perspective view of the vibration damping tape adhered to a substrate.

As shown in FIG. 2, the self-adhesive vibration damping tape 10 is preferably adhered to a substrate 24 such as an automotive or appliance part. The substrate surface does not require any special preparation. The tape will also adhere to oily surfaces such as oily metals. In addition, the tape may be applied either prior to or after a commercial paint bake process, such as those encountered in automotive applications.

The tape is adhered to the substrate by peeling away the release liner and adhering the second surface 16 of the tape to the substrate 24 such that the aluminum facing 18 faces outward. The aluminum foil facing aids in providing sound damping properties. While the facing preferably comprises aluminum foil, it should be appreciated that the facing may also comprise other metals, or plastics such as polyester or EPDM.

While the tape is illustrated on only one area of the substrate, it should be appreciated that multiple pieces of tape may be applied to different areas of the substrate. The tapes may also be die cut in different sizes or shapes as needed, for example, in use with die-cut parts and extruded profiles. The tape may be adhered to a wide variety of substrates including, but not limited to, wood, glass, metal, painted or primed metals, and fabric.

In automotive applications, the substrates may be in the form of galvanized metal, such as galvanized steel, galvanneal (a carbon steel panel which has been coated with an iron-zinc alloy which renders the panel corrosion resistant and paint ready), and painted or electrocoated metal. The tape may be used, for example, to adhere to automotive floor boards, door panels, roof panels, trunk panels, deck lids, trunk lids, wheel wells, side pillars, and other areas where sound and/or vibration damping is desired.

In appliance applications, the substrates may be in the form of metals such as aluminum and steel. The tape may be adhered, for example, on unexposed perimeters of appliances.

The tape may also be applied to the interiors of office equipment utilizing steel and stainless steel substrates such as photocopiers, printers, and office furniture such as steel desks, chairs, etc.

In order that the invention may be more readily understood, reference is made to the following examples which are intended to illustrate the invention, but not limit the scope thereof.

EXAMPLE 1

The following vibration damping tape samples A–E were produced in accordance with the present invention using the components below (listed in parts by. weight):

TABLE 1

|  | A | B | C | D | E |
|---|---|---|---|---|---|
| Butyl rubber[1] | 150 | 150 | 150 | 150 | 150 |
| Antioxidant[2] | 9 | 9 | 9 | 9 | 9 |
| Mississippi Lime | 0 | 0 | 0 | 30 | 0 |
| Carbon black | 30 | 30 | 30 | 30 | 30 |
| Amorphous silicon dioxide[3] | 30 | 30 | 30 | 30 | 30 |
| Oleic Acid | 3 | 3 | 3 | 3 | 3 |
| Barium sulfate | 1200 | 1200 | 1200 | 1200 | 1200 |
| Plasticizer[4] | 530 | 35 | 0 | 600 | 530 |
| Automotive Paint Powder[5] | 755 | 755 | 755 | 755 | 755 |
| Polyisobutylene[6] | 0 | 0 | 0 | 0 | 140 |
| Hydrogenated rosin ester[7] | 150 | 150 | 0 | 0 | 150 |
| Polyisobutylene[8] | 140 | 140 | 140 | 0 | 0 |
| Plasticizer[9] | 0 | 530 | 530 | 0 | 0 |
| Tackifier[10] | 0 | 0 | 150 | 150 | 0 |

[1]Exxon 065 from Exxon Mobil Chemical
[2]Wingstay L from Goodyear
[3]Aerosil 200 from Degussa
[4]H-300 from Amoco Chemical
[5]Dry Pure II from Haden, Inc.
[6]LMMH from Exxon Mobil Chemical
[7]Komotac KF-462S from Komo Chemical
[8]Vistanex CP-24 from Exxon Mobil Chemical
[9]H-1900 from Amoco Chemical
[10]Nevtac from Neville Chemical Samples A–D were then damped on one side of an Oberst Bar and tested at various temperatures using the Oberst Bar test method based on ASTM E 756-93 and SAE J1637. Oberst testing as described in SAE J1637 involves applying a damping material to be tested on a supporting steel bar and measuring damping over a range of frequencies and temperatures using the half-power bandwidth technique.

The composite damping performance is given by the formula:

$$\eta_c = \frac{\Delta f}{f}$$

where:
$\Delta f = f_u - f_l$ = frequency bandwidth, Hz
f = resonant frequency, Hz
$\eta_c$ = composite loss factor at resonant frequency f, dimensionless The results are shown below in Table 2. All samples had an aluminum foil facing thickness of 0.08 mm. Sample A had a thickness (aluminum foil facing and tape) of 1.73 mm and a density of 1.40 gm/ml. Sample B had a thickness of 2.47 mm and a density of 1.38 gm/ml. Sample C had a thickness of 1.78 mm and a density of 1.38 gm/ml. Sample D had a thickness of 2.37 mm and a density of 1.39 gm/ml. The samples were tested at five different frequencies and then interpolated at 200 Hz

TABLE 2

Vibration Damping Properties

|  | Sample A | Sample B | Sample C | Sample D |
|---|---|---|---|---|
| −40° C. |  |  |  |  |
| Avg. bar loss factor ($\eta$) | 0.024 | 0.027 | 0.028 | 0.027 |
| Avg. composite loss factor ($\eta_c$) | 0.075 | 0.111 | 0.099 | 0.091 |
| Avg. damping material loss factor ($\eta_1$) | 0.107 | 0.172 | 0.124 | 0.109 |
| Avg. Young's Modulus | 3.11E+09 | 1.70E+09 | 5.95E+09 | 3.41+09 |
| −20° C. |  |  |  |  |
| Avg. bar loss factor | 0.024 | 0.027 | 0.028 | 0.027 |
| Avg. composite loss factor | 0.078 | 0.128 | 0.082 | 0.082 |
| Avg. damping material loss factor | 0.100 | 0.153 | 0.103 | 0.098 |
| Avg. Young's Modulus | 3.87E+09 | 3.59E+09 | 4.99E+09 | 2.85E+09 |
| 0° C. |  |  |  |  |
| Avg. bar loss factor | 0.024 | 0.027 | 0.028 | 0.027 |
| Avg. composite loss factor | 0.166 | 0.252 | 0.115 | 0.144 |
| Avg. damping material loss factor | 0.219 | 0.302 | 0.144 | 0.175 |
| Avg. Young's Modulus | 3.21E+09 | 2.51E+09 | 4.53E+09 | 2.44E+09 |
| 20° C. |  |  |  |  |
| Avg. bar loss factor | 0.024 | 0.027 | 0.028 | 0.027 |
| Avg. composite loss factor | 0.313 | 0.280 | 0.485 | 0.291 |
| Avg. damping material loss factor | 0.438 | 0.341 | 0.634 | 0.365 |
| Avg. Young's Modulus | 2.23E+09 | 2.02E+09 | 3.14E+09 | 1.65E+09 |
| 40° C. |  |  |  |  |
| Avg. bar loss factor | 0.024 | 0.027 | 0.028 | 0.027 |
| Avg. composite loss factor | 0.314 | 0.351 | 0.458 | 0.602 |
| Avg. damping material loss factor | 0.487 | 0.469 | 0.644 | 1.128 |
| Avg. Young's Modulus | 1.58E+09 | 1.06E+09 | 3.44E+09 | 4.72E+08 |
| 60° C. |  |  |  |  |
| Avg. bar loss factor | 0.024 | 0.027 | 0.028 | 0.027 |
| Avg. composite loss factor | 0.349 | 0.321 | 0.340 | 0.136 |
| Avg. damping material loss factor | 0.796 | 0.437 | 0.738 | 0.165 |
| Avg. Young's Modulus | 8.08E+08 | 9.42E+08 | 6.83E+08 | 2.41E+09 |

As can be seen, a comparison of the composite loss factor (sound damping tape adhered to bar) and the bar loss factor (undamped bar) shows that a significant improvement in sound damping properties occurs with the use of the sound damping tape of the present invention. At lower temperatures, the improvement in damping properties is 3–4 times greater, and at higher temperatures the improvement is up to 20 times greater.

Samples A–D were also subjected to long term aging tests after being adhered to a number of different panels. The aging tests were designed to simulate extreme climate conditions that may be encountered in use, such as paint bake heating and cooling cycles that are typically encountered during the manufacturing process of automotive parts. "HB" represents high bake adhesion to galvanized metal panels and galvaneal panels which included heating for 20 minutes at 325° F., followed by cooling to room temperature, heating for 20 minutes at 325° F., cooling to room temperature, heating for 30 minutes at 250° F., then cooling to room temperature. "LB" represents low bake adhesion to electrocoated (E-coat) panels, galvanized metal panels and galvaneal panels which included heating for 30 minutes at 250° F. followed by cooling to room temperature.

The aging results are shown below in Table 3, where CF indicates 100% cohesive failure.

TABLE 3

Tape Samples
Adhesion Properties

| Aging Conditions | A | B | C | D | E | Specification requirement[1] |
|---|---|---|---|---|---|---|
| 250 hrs humidity | | | | | | |
| E-coat LB | CF | 80% CF | CF | CF | CF | CF |
| Galvanized LB | CF | CF | CF | CF | CF | CF |
| Galvanized HB | CF | 50% CF | CF | CF | CF | CF |
| Galvaneal LB | 50% CF | 50% CF | CF | CF | CF | CF |
| Galvaneal HB | CF | CF | CF | CF | CF | CF |
| 250 hrs @ 175° F. heat aging | | | | | | |
| E-coat LB | CF | CF | CF | CF | CF | CF |
| Galvanized LB | CF | 50% CF | CF | CF | CF | CF |
| Galvanized HB | CF | CF | CF | CF | CF | CF |
| Galvaneal LB | CF | 50% CF | CF | CF | CF | CF |
| Galvaneal HB | CF | CF | CF | CF | CF | CF |
| 250 hrs in salt spray | | | | | | |
| E-coat LB | | | | | | |
| Galvanized LB | 50% CF | CF | CF | CF | CF | CF |
| Galvanized HB | CF | 50% CF | CF | CF | CF | CF |
| Galvaneal LB | CF | CF | CF | CF | CF | CF |
| Galvaneal HB | 50% CF | CF | CF | CF | CF | CF |
| Cycle Test (5 cycles) 16 hrs @ 175° F., 24 hrs humidity, 8 hrs @ 20° F. | | | | | | |
| E-coat LB | CF | 60% CF | CF | CF | CF | CF |
| Galvanized LB | CF | AF | CF | CF | CF | CF |
| Galvanized HB | CF | CF | CF | CF | CF | CF |
| Galvaneal LB | 50% CF | 50% CF | CF | CF | CF | CF |
| Galvaneal HB | CF | CF | CF | CF | CF | CF |

[1]Chrysler Corporation Engineering Standard MS-CD629 Type F

As can be seen, Samples C, D and E passed all specification requirements for cohesive failure. While samples A and B did not pass all of the indicated specification requirements, they could be approved for use in accordance with other specification requirements.

It will be apparent to those skilled in the art that various changes may be made without departing from the scope of the invention which is not considered limited to what is described in the specification.

What is claimed is:

1. A self-adhesive vibration damping tape comprising:

a vibration damping composition comprising a synthetic rubber polymer, a thermoplastic polymer selected from the group consisting of amorphous polyolefins ethylene-based copolymers, and ethylene based terpolymers; a plasticizer, and an organic filler comprising recycled automotive paint powder; wherein said vibration damping composition is in the form of a tape having first and second major surfaces.

2. The vibration damping tape of claim 1 further including a release liner adhered to at least one major surface of said tape.

3. The vibration damping tape of claim 1 further including an aluminum foil facing laminated to at least one major surface of said tape.

4. The vibration damping tape of claim 1 wherein said synthetic rubber polymer is selected from the group consisting of butyl rubber, polyisobutylene, and mixtures thereof.

5. The vibration damping tape of claim 1 wherein said thermoplastic polymer comprises an amorphous polyolefin selected from the group consisting of polypropylene-ethylene copolymers, polypropylene/polypropylene-ethylene copolymers, polypropylene homopolymers, polyethylene homopolymers, and mixtures thereof.

6. The vibration damping tape of claim 1 wherein said thermoplastic polymer comprises an ethylene-based copolymer or ethylene based terpolymer selected from the group consisting of ethylene/vinyl acetate copolymers, ethylene/vinyl acetate/acid terpolymers, ethylene-acrylic acid copolymers, and mixtures thereof.

7. The vibration damping tape of claim 1 wherein said plasticizer comprises polybutene.

8. The vibration damping tape of claim 1 wherein said vibration damping composition further includes an antioxidant.

9. The vibration damping tape of claim 1 wherein said vibration damping composition further includes an adhesion promoter.

10. The vibration damping tape of claim 1 wherein said vibration damping composition further includes a coloring agent.

11. The vibration damping tape of claim 1 wherein said vibration damping composition further includes an inorganic filler.

12. The vibration damping tape of claim 1 having a thickness of about 0.5 to 2.0 mm.

13. In combination, a self-adhesive vibration damping tape and a substrate comprising:

a vibration damping composition provided in the form of a tape having first and second major surfaces, said tape being laminated on said first surface to an aluminum foil facing; said vibration damping composition comprising a synthetic rubber polymer, a thermoplastic polymer selected from the group consisting of amorphous polyolefins, ethylene-based copolymers, and ethylene-based terpolymers, where said amorphous polyolefins are selected from the group consisting of polypropylene-ethylene copolymers, polypropylene/polypropylene-ethylene copolymers, polypropylene homopolymers, polyethylene homopolymers, and mixtures thereof; a plasticizer, and an organic filler; wherein said vibration damping tape is adhered to said substrate on said second surface.

14. The combination of claim 13 wherein said substrate is comprised of a material selected from the group consisting of metal, wood, glass, and fabric.

15. The combination of claim 13 exhibiting a minimum composite loss factor of 0.05 at a temperature range of −40° C. to 60° C. and resonance frequency of 200 Hz.

16. A self-adhesive vibration damping tape composition comprising:
   from about 5 to 10% by weight of a synthetic rubber polymer;
   from about 1 to 10% by weight of a thermoplastic polymer selected from the group consisting of amorphous polyolefins ethylene-based copolymers, and ethylene based terpolymers;
   from about 15 to 30% by weight of a plasticizer; and
   from about 5 to 50% by weight of an organic filler comprising recycled automotive paint powder.

17. The self-adhesive vibration damping tape composition of claim 16 comprising from about 23 to about 27% by weight of said organic filler.

18. A self-adhesive vibration damping tape comprising:
   a vibration damping composition comprising a synthetic rubber polymer, a thermoplastic polymer comprising an amorphous polyolefin selected from the group consisting of polypropylene-ethylene copolymers, polypropylene/polypropylene-ethylene copolymers, polypropylene homopolymers, polyethylene homopolymers, and mixtures thereof; a plasticizer, and an organic filler; wherein said vibration damping composition is in the form of a tape having first and second major surfaces including an aluminum foil facing laminated to at least one major surface of said tape.

* * * * *

UNITED STATES PATENT AND TRADEMARK OFFICE
CERTIFICATE OF CORRECTION

PATENT NO. : 6,828,020 B2
DATED : December 7, 2004
INVENTOR(S) : Fisher et al.

It is certified that error appears in the above-identified patent and that said Letters Patent is hereby corrected as shown below:

Column 2,
Line 17, "plasticizer," should read -- plasticizer; --
Line 44, "-0°C to 60°C" should read -- -40°C to 60°C --

Column 4,
Line 57, "4108," should read -- 6108, --

Column 5,
Line 7, "Polysat Suitable" should read -- Polysat. Suitable --

Column 7,
Line 21, "by." should read -- by --

Column 11,
Line 7, "polyolefins" should be -- polyolefins, --

Signed and Sealed this

Tenth Day of May, 2005

JON W. DUDAS
*Director of the United States Patent and Trademark Office*